Jan. 14, 1964  W. H. ABILDGAARD ETAL  3,117,341
DIP-COATING METHOD AND APPARATUS
Filed June 18, 1959  3 Sheets-Sheet 1
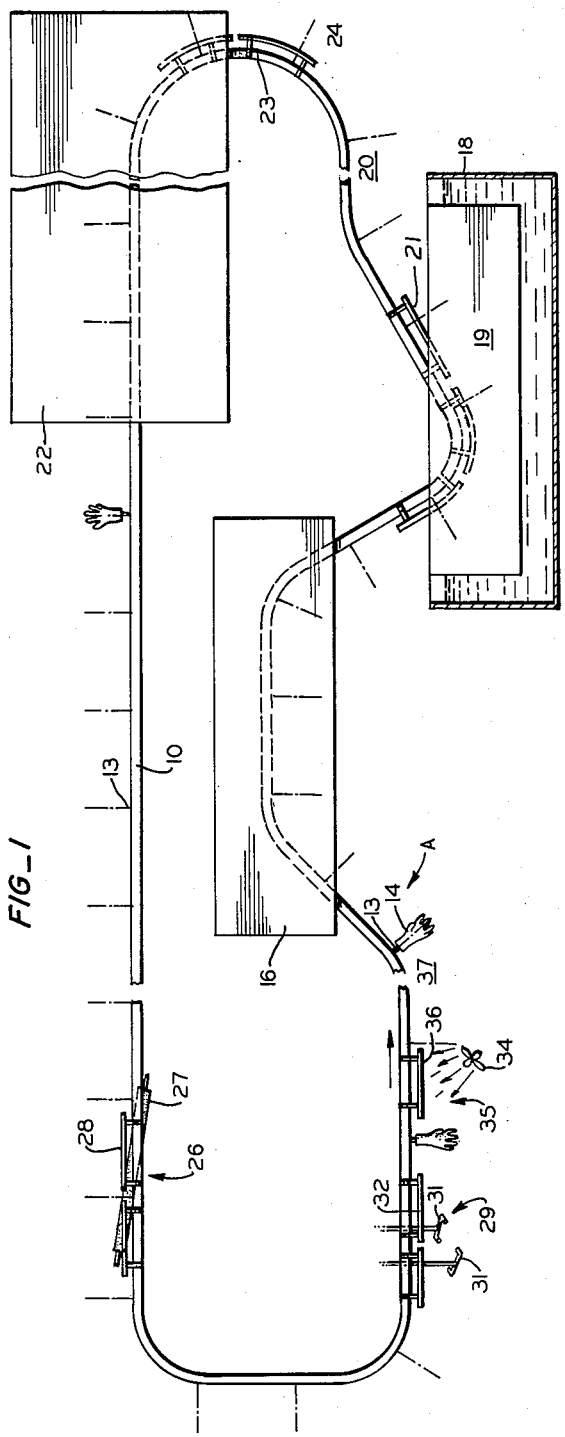
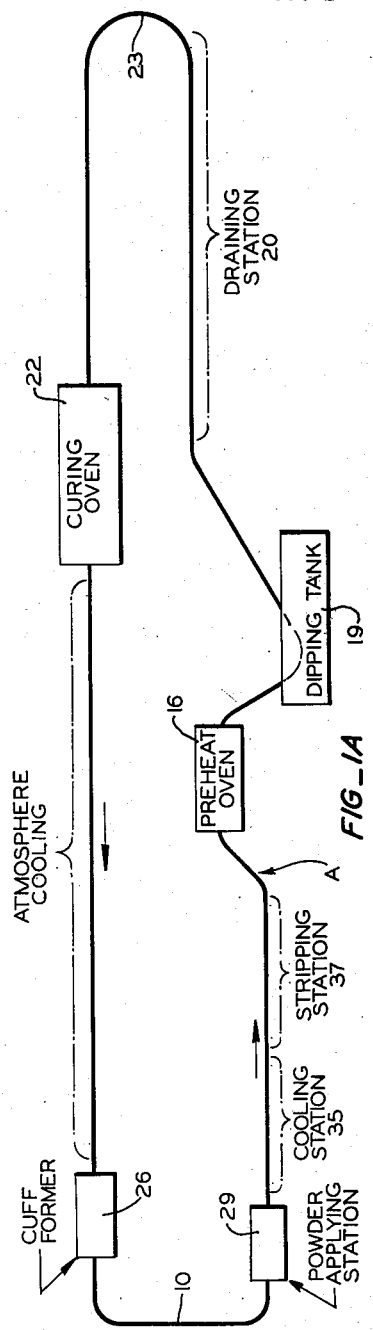
INVENTORS
WILLIAM H. ABILDGAARD
ROY E. DAVIS
BY
ATTORNEYS Jan. 14, 1964   W. H. ABILDGAARD ETAL   3,117,341
DIP-COATING METHOD AND APPARATUS
Filed June 18, 1959   3 Sheets-Sheet 2
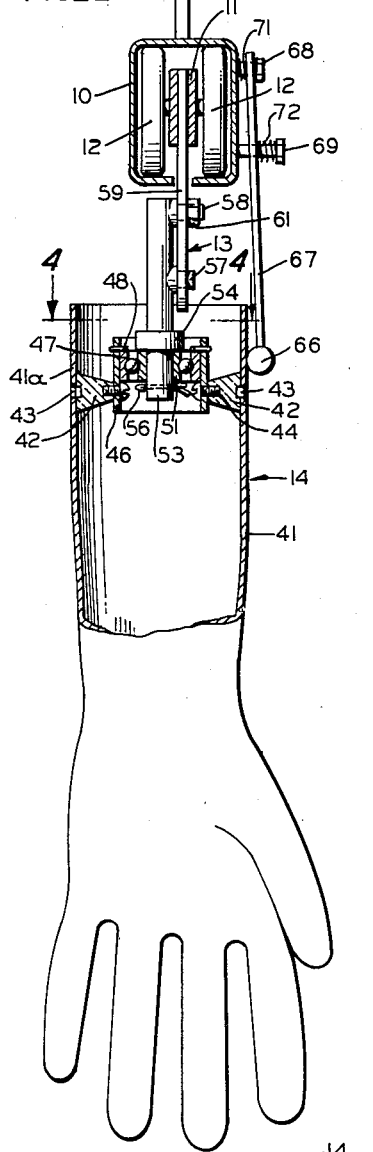
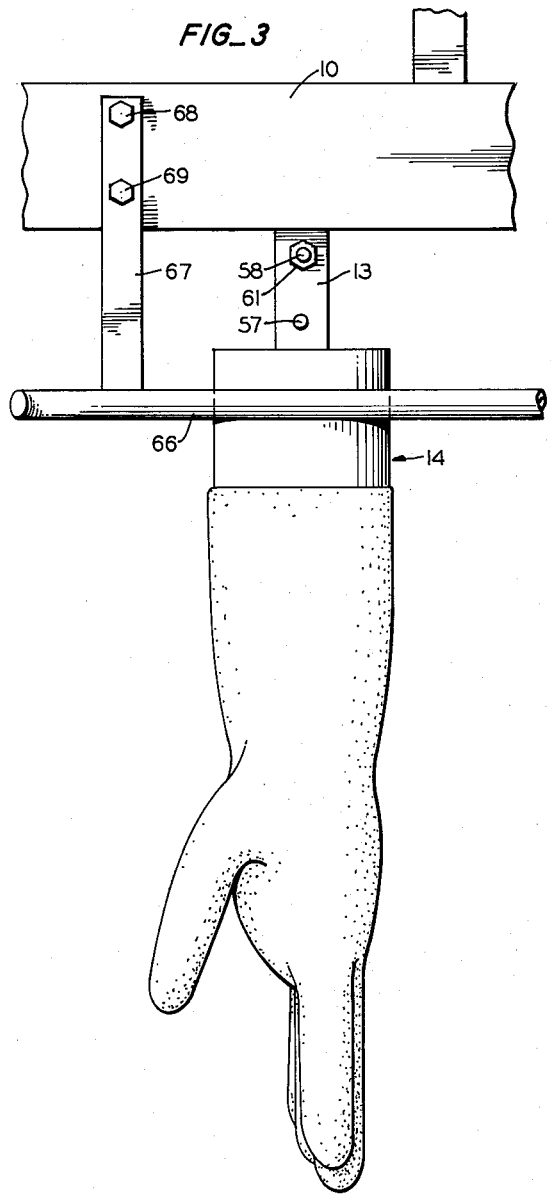
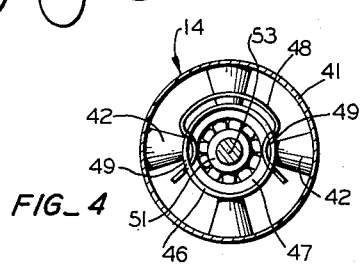
INVENTORS
WILLIAM H. ABILDGAARD
ROY E. DAVIS
BY
ATTORNEYS Jan. 14, 1964 W. H. ABILDGAARD ETAL 3,117,341
DIP-COATING METHOD AND APPARATUS
Filed June 18, 1959 3 Sheets-Sheet 3
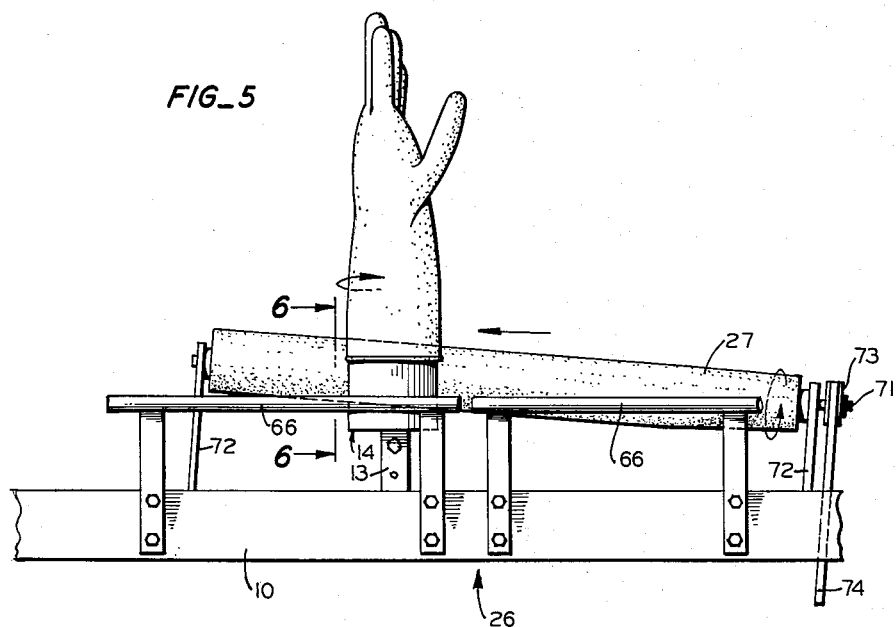
FIG_5
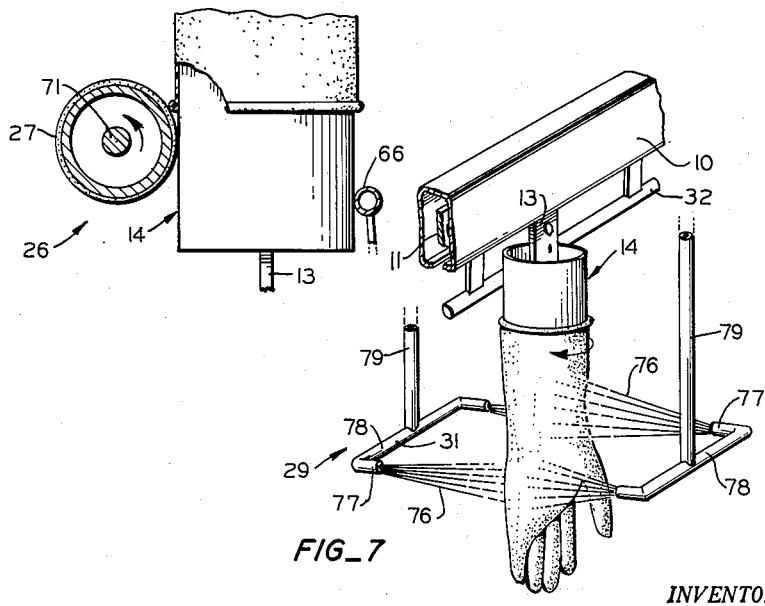
FIG_6
FIG_7
INVENTORS
WILLIAM H. ABILDGAARD
ROY E. DAVIS
BY
*Allen and Thomey*
ATTORNEYS

United States Patent Office 3,117,341
Patented Jan. 14, 1964

3,117,341
DIP-COATING METHOD AND APPARATUS
William H. Abildgaard, San Jose, and Roy E. Davis,
 Glendale, Calif., assignors to Plastomeric Products
 Corporation, San Jose, Calif., a corporation of
 California
Filed June 18, 1959, Ser. No. 821,188
3 Claims. (Cl. 18—4)

The present invention relates to the manufacture of articles such as plastic gloves, by passing molds corresponding to the configuration of a hand through a liquid plastic to receive a liquid coating thereon, and afterwards causing setting of this coating by the application of heat in order to provide a thin glove of uniform thickness dimension. The invention is concerned more particularly with the construction of the conveying means and the various processing stations therealong and with the mold structure itself to provide new and improved characteristics in all of these elements.

In the dip-coating of articles such as plastic gloves, for example where heat is applied after a liquid coating is formed on the mold in order to cure or set this coating to its final form, the structure of the conveyor system in relation to the various treating stations along its path, and the mold structure in relation to the conveyor are highly important in order to control the application of heat in the process and to confine the heating to the mold element itself, or the metallic shell upon which the article is formed and cured or set. Where the article is a plastic glove made from a vinyl dispersion for example, the thickness of the article on the various portions of the mold can be advantageously controlled by uniform application of heat and motion of the mold during curing. Also the application of heat must be such that no undue waste of heat occurs by conduction to the conveying system, so that the heated mold will tend to remain at the desired heat long enough to affect the purpose of the heat application. Also certain operations can desirably be performed while the article is still hot on the mold and before final cooling is effected as the article is still in a semi-plastic condition or semi-cured condition and so can be manipulated, for example in forming a cuff on a glove while still hot and having the property of adherence to itself.

Accordingly it is the general object of the present invention to provide improved apparatus and methods for the production of dip-coated articles from solutions such as vinyl dispersions.

Still another object of the invention is to provide desirable means for obtaining uniform conditioning of the articles as for example by rotation of the mold at desired locations along its path of travel where a change in condition of the article is being effected which must be uniform about its entire periphery.

Still another object of the invention is to provide a dip-coating apparatus and method in which the article after being coated with a liquid, and as it is entering the heat-curing or setting zone, is inverted and rotated during inversion in order to control the characteristics of the finished article.

A further object of the invention is to provide in a dip-coating apparatus and method, a mold construction which having heat controlling characteristics for localizing the heat in the desired place and minimizing transmission to undesired parts of the apparatus.

A still further object of the invention is to provide a dip-coating apparatus embodying means for producing a rolled cuff on the dip-coated articles such as a glove for example.

Other objects and advantages of the invention will be apparent from the following description of a preferred form thereof as disclosed in the attached drawings, in which:

FIGURE 1 is a schematic view illustrating the apparatus and method.
FIGURE 1A is a diagram illustrating the process of the invention.
FIGURE 2 is an elevational view partially in section taken transversely to the conveying track, and illustrating the construction of the mold and its mounting on the track.
FIGURE 3 is a side elevational view of the conveying track with a mold suspended therefrom and traveling past a mold rotating means.
FIGURE 4 is a detailed sectional view of the mold structure indicated by the line 4—4 in FIGURE 2.
FIGURE 5 is a fragmentary elevational view illustrating the construction of the cuff-forming means.
FIGURE 6 is a fragmentary sectional elevation of the cuff-forming means taken as indicated by the lines 6—6 in FIGURE 5.
FIGURE 7 is a perspective view of the powder applying means for coating the glove.

Referring to FIGURES 1 and 1A, there is illustrated schematically an apparatus for carrying out the method of the instant invention and the apparatus includes generally an endless track 10 for an endless conveyor or chain 11 (FIGURES 1, 1A and 2) whose links carry at each of its points of articulation a pair of rollers 12 passing around inside of the closed track 10. Extending from the chain 11 and from the track 10, there are a series of rigidly connected mold supporting elements 13 indicated schematically in FIGURE 1 which support a series of molds 14 in a manner later described.

In describing generally the cycle of operation, the chain 11 is assumed to be traveling continuously at a normal rate of speed so that the molds 14 are carried through the various treating stations. For convenience, the operation is described as starting at the point A in FIGURE 1 where a mold 14 is shown just ahead of its entry into a pre-heating station 16 where the molds are subjected to a heating atmosphere at the desired temperature for pre-heating of the molds to obtain the desired thickness of material thereon. After the molds 14 pass out of the pre-heating station 16, they enter the dipping tank or station 19 containing the vinyl dispersion. The tank 19 is disposed in a water bath contained in a tank 18, the water bath being maintained at a temperature of about 100 degrees F. to 140 degrees F., and preferably about 120 degrees F. As they pass through the tank 19, the molds 14 are rotated by rotating means 21 described later in detail as they pass through this station. After leaving the dipping station 19 the molds 14 are carried through a draining station 20 where excess material is allowed to drip off and is caught and recovered for re-use.

After draining for the desired extent, the coated molds 14 are carried into a curing station 22 which may comprise an oven maintained at the desired temperature with reference to the particular coating material to obtain the desired curing or setting operation. Inasmuch as the molds are coated with liquid, and have been in depending position with the fingers lowermost there will tend to be an excess of material on the tips of the fingers and the thumb, and this excess must be desirably redistributed over the entire finger portion or such portions thereof as may be necessary to obtain the desired uniform thickness. A desirable distribution of material is effected by inverting the molds as they pass from the drainage area into the heating station as shown for example by the curved portion 23 of the track 10, and again the molds are rotated by rotating means 24 as this inversion takes place so that the liquid material at the tip of the fingers will flow down evenly over the finger portions.

The molds are maintained in upright position with the fingers uppermost in the curing station or oven for the desired period of time and then the molds 14 travel through an atmosphere cooling zone where their temperature is reduced to about 100 degrees F. to 200 degrees F. and to preferably about 140 degrees F. A further setting of the material of the glove will occur due to this cooling. The molds are then carried to a cuff-forming station 26 where the partially cured plastic is rolled from the cuff edge towards the wrist portion by a roller 27, described in detail hereinafter, while they are being rotated by a rotating means 28. In this partially cured condition, the rolling of the cuff portion over itself in layers produces an integral rib at the end of the cuff which will adhere together during the remaining time the gloves are on the molds.

From the cuff-forming station 26, the molds are progressed to a powdering station 29 where opposed powder jet means 31 are provided on either side of the path of travel and where a rotating means 32 is provided so that the glove as it passes is uniformly coated with the powder. After the glove has passed through the powdering station 29 it is subjected to an air blast from a fan 34 at a cooling station 35 and again is turned by rotating means 36. The glove obtains its final set at this time being cooled to the desired temperature at which it will strip free from the mold at the subsequent stripping station 37 just ahead of the beginning point A selected for this description.

Having described the various steps through which the mold and its coating are taken in the formation or manufacture of a glove, the specific structure of some of the control elements will now be described.

The mold 14 is preferably formed as a thin shell 41 of heat-conducting material, for example of copper with a layer of nickel plating over the copper, the shell 41 illustrated being in the configuration of the left-hand of a person as shown in FIGURE 2. Preferably, this metallic shell 41 is heat insulated from its heat-conducting supporting means and for this purpose carries four heat insulating mounting elements 42 (FIGURES 2 and 4) of ceramic construction. Each element 42 is recessed at each end, one end receiving a rivet 43 by which is riveted to the shell 41 and the other end being threaded to receive a fastening screw 44 by means of which it is attached to a mounting sleeve 46. The sleeve 46 is coaxial with a cylindrical end or wrist portion 41a of the shell, and is of the proper internal diameter to receive freely the outer race 47 of a ball bearing, which race is retained in place by a spring clip 48 which is of general U shape and engages in opposite slots 49 in the sleeve 46. The inner race 51 of the bearing FIGURE 2 is secured on a mounting shaft 53 below an enlarged shoulder 54 thereof and is held thereon by a cotter pin 56. The shaft 53 extends upwardly and has two lateral projections 57 and 58 which are received in respective apertures of a carrier or mounting bar 59, secured to a link of the chain 11 as previously described. The extension 58 is threaded so that the rod or shaft 53 is held on the bar 59 by means of a nut 61.

From the above description, it is seen that the mold structure is such that it is rotatably mounted on a carrier about an axis coinciding with an axis of a cylindrical hand or wrist portion. By removing the retaining spring 48, the mold can be stripped from its carrier by a simple endwise movement and correspondingly another mold replacing it can be inserted.

Various means have described generally for rotating the mold at various stages of the process, and all these means are similar and being illustrated in detail in FIGURES 2 and 3. Each rotating means comprises one or more round bars 66 extending parallel to the path of travel of the mold, and having mounting means resiliently urging the bar toward the molds 14 to engage the cylindrical wrist portion thereof and produce rotation of a mold as it travels. The mounting means for each bar 66 comprise a plurality of straps 67 secured to each bar 66 and each having respective apertures loosely received on a pair of studs 68 and 69, supported on the track 10, the strap 67 being movably supported on these studs. Each strap 67 is urged outwardly at the top by a compression spring 71 disposed between the strap 67 and the adjacent wall of track 10, and is urged inwardly adjacent to stud 69 by a compression spring 72 disposed between the head of the stud and the other side of the strap 67. In this way, the extent of the spring pressure applied between a bar 66 and a mold 14 to obtain the desired rotation thereof can be controlled. The entrance ends of the bars 66 are bent outwardly to provide for initial engagement of a mold 14 therewith.

The various rotating means at the station 19, at the station 22, at the station 26, and at the stations 29 and 33, are all of the same construction, differing only in length and also in configuration of the respective bars 66.

At rotating locations where the extent of travel of a mold 14 approximates or its greater than the spacing between the molds 14 on the chain, the rotating means is preferably made sectional, each bar of a sectional construction being of slightly less length than the spacing between adjacent molds 14. Thus, only one mold will be engaged with a rotating bar 66 at the same time, thereby insuring rotation of each mold at the desired location.

Referring to FIGURES 5 and 6, the cuff forming means is illustrated as comprising a roller 27 of suitable material, such as fabric, mounted for rotation on a shaft 71 which is journalled in suitable supporting brackets 72, and carries a pulley 73 driven by a belt 74 from a suitable source of power. The shaft 71 has its axis inclined or at an angle to the adjacent path of travel of the molds 14, and the location of the lower end of roller 27 is adjacent to the entry end of the cooperating bar 66. As a result, the roller 27 starts its rolling action at the edge of the plastic coating on the mold 14, and as the mold 14 and the glove thereon progress past the roller 27, this roller rolls the outer edge or cuff portion of the glove up into a wrist band. At this time the plastic is sufficiently adhesive so that the rolled portion adheres to it itself and forms an integral cuff band.

Referring to FIGURE 7 there is illustrated the powder applying means in the form of a plurality of opposed sprays 76 issuing from spaced nozzles 77 at the bent end of a pair of opposed pipes 78 leading from a pair of supply pipes 79. The structure is the same on both sides and each supply pipe 79 leads to a source of powder, and a source of air pressure so that the powder is sprayed on the glove as it is rotated by the rotating means 32.

While we have shown and described certain preferred methods and apparatus for employing the present invention, it is apparent that such inventions are capable of variation and modification from the forms shown, so that the scope thereof should be limited only by the proper scope of the claims appended hereto.

What we claim is:

1. In a dip-coating apparatus, an endless conveyor including a plurality of support members having a corresponding plurality of hollow thin metal molds supported thereon having the configuration of a hand, an endless track for guiding and controlling said conveyor, a pre-heating station positioned along the path of said conveyor for pre-heating the molds as they are carried therethrough, a dipping station positioned along the path of said conveyor and in which the molds are immersed in a solution with the molds in depending relation with the fingers directed downwardly, a heating station disposed along the path of said conveyor, said heating station comprising an oven disposed around said conveyor and providing a zone of hot gaseous heating medium, said track including an upwardly extending arcuate portion disposed substantially half outside of said oven and substantially half inside of said oven and interposed between said dipping and heating stations for inverting said molds to an upright position by swinging the support member and a mold thereon through an arcuate path including an arcuate path portion outside said heating station and an arcuate portion inside said heating station to cause even distribution of material over the fingertips, and mold engaging and rotating elements disposed along said respective arcuate path portions for engaging and rotating said molds during said inversion.

2. The method of forming plastic articles by dip-coating in which one or more molds are carried through various treating stations, which comprises providing a hollow thin metal shell as a mold, providing a heat coagulable dispersion of plastic material, carrying the mold in substantially vertical depending position through the dispersion at a dipping station while rotating the mold to coat it with a liquid layer of the dispersion, removing the mold from the dispersion while in the vertical depending position and draining excess dispersion from the mold, moving the mold toward a heating station wherein heat is supplied at a sufficient rate to quickly coagulate said dispersion, and while moving the mold beginning to invert it and simultaneously rotating it, moving the mold into the heating station while continuing to invert and rotate the mold both during and after entry into the heating station, the continued inversion and rotating of the mold distributing the dispersion substantially uniformly on the mold, and subjecting the mold with the dispersion substantially uniformly distributed thereon to heat in the heating station to quickly coagulate the dispersion and maintain the latter in its substantially uniform distribution on the mold.

3. The method of forming plastic articles by dip-coating in which one or more molds are carried through various treating stations, which comprises providing a hollow thin metal shell as a mold, heat-insulating the mold from its supporting means, providing a heat coagulable dispersion of plastic material, carrying the mold in substantially vertical depending position through the dispersion at a dipping station while rotating the mold to coat it with a liquid layer of the dispersion, removing the mold from the dispersion while in the vertical depending position and draining excess dispersion from the mold, moving the mold toward an oven wherein heat is supplied at a sufficient rate to quickly coagulate said dispersion, and in so moving the mold moving it through a curved path with the end of the mold which was lowermost while being dipped at the outside of the curved path, and while moving the mold beginning to invert it to a vertical upright position by said movement and simultaneously rotating it, thereby starting to effect substantially uniform distribution of the dispersion on the mold, moving the mold into the oven while continuing to invert it to a substantially vertical upright position and rotating the mold both during and after entry into the oven, the continued inversion to a vertical upright position and the rotating of the mold completing and maintaining the uniform distribution of the dispersion on the mold, and subjecting the mold with the dispersion substantially uniformly distributed thereon to heat in the oven to quickly coagulate the dispersion and maintain the latter in its substantially uniform distribution on the mold.

References Cited in the file of this patent

UNITED STATES PATENTS

| | | |
|---|---|---|
| 1,154,191 | Mahoney | Sept. 21, 1915 |
| 1,160,923 | Mahoney | Nov. 16, 1915 |
| 1,774,453 | Raiche | Aug. 26, 1930 |
| 1,875,028 | Kurkjian | Aug. 30, 1932 |
| 2,228,992 | Fry | Jan. 14, 1941 |
| 2,233,555 | Reisinger | Mar. 4, 1941 |
| 2,244,591 | Youngs et al. | June 3, 1941 |
| 2,260,854 | Killian | Oct. 28, 1941 |
| 2,299,269 | Gammeter | Oct. 20, 1942 |
| 2,353,256 | Maywald | July 11, 1944 |
| 2,482,418 | Jenkins | Sept. 20, 1949 |
| 2,529,829 | Banks | Nov. 14, 1950 |
| 2,712,161 | Moss | July 5, 1955 |
| 2,731,668 | Miner | Jan. 24, 1956 |
| 2,779,055 | Burger | Jan. 29, 1957 |
| 2,916,765 | Heller | Dec. 5, 1959 |
| 2,958,095 | Ahlefeld et al. | Nov. 1, 1960 |